(12) United States Patent
Legrand et al.

(10) Patent No.: US 7,042,635 B2
(45) Date of Patent: May 9, 2006

(54) PARAMETRIC AMPLIFIER WITH ADJUSTABLE PUMP SOURCE

(75) Inventors: Anne Legrand, Marcoussis (FR); Dominique Bayart, Clamart (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/862,578

(22) Filed: Jun. 8, 2004

(65) Prior Publication Data

US 2004/0263951 A1    Dec. 30, 2004

(30) Foreign Application Priority Data

Jun. 25, 2003    (EP) .................................. 03291570

(51) Int. Cl.
*H04B 10/12*    (2006.01)
(52) U.S. Cl. .................................. 359/341.41
(58) Field of Classification Search ................ 359/334, 359/341.41, 341.42
See application file for complete search history.

(56) References Cited

U.S. PATENT DOCUMENTS

| 6,471,965 | B1 | 10/2002 | Golubev et al. | |
| 6,611,370 | B1 * | 8/2003 | Namiki et al. ............... | 359/334 |
| 6,751,421 | B1 * | 6/2004 | Ranka et al. ................ | 398/141 |
| 2004/0042060 | A1 * | 3/2004 | McKinstrie et al. ........ | 359/330 |
| 2005/0179991 | A1 * | 8/2005 | Fujimura et al. ........... | 359/334 |

FOREIGN PATENT DOCUMENTS

EP    0 859 435 A2    8/1998

OTHER PUBLICATIONS

Me Marhic et al, "Tunable narrow bandpass filters with gain based on fiber optical parametric amplification", QUELS '96, Quantum Electronics and Laser Science Conference, Technical Digest Series Conference Edition, Anaheim, CA, USA—vol. 10—Jun. 2-7, 1996, pp. 9-10, XP002258636.

* cited by examiner

*Primary Examiner*—Jack Keith
*Assistant Examiner*—Ari Diacou
(74) *Attorney, Agent, or Firm*—Sughrue Mion, PLLC

(57) ABSTRACT

The invention is related to a parametric amplifier connected to a pump laser with a control device for adapt the pump laser. This amplifier is used in a transmission system. In addition the invention comprises a method for controlling the pump laser source in an iterative process to optimize the gain of the amplifier.

5 Claims, 4 Drawing Sheets

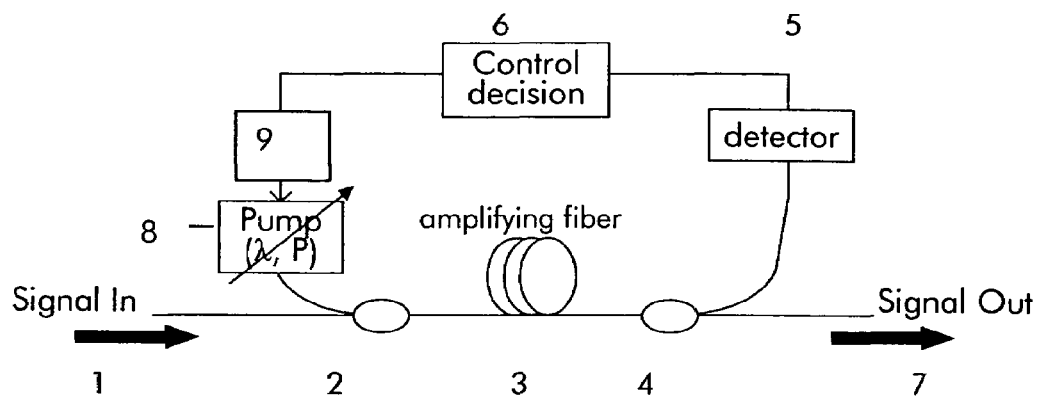
FIG: 2
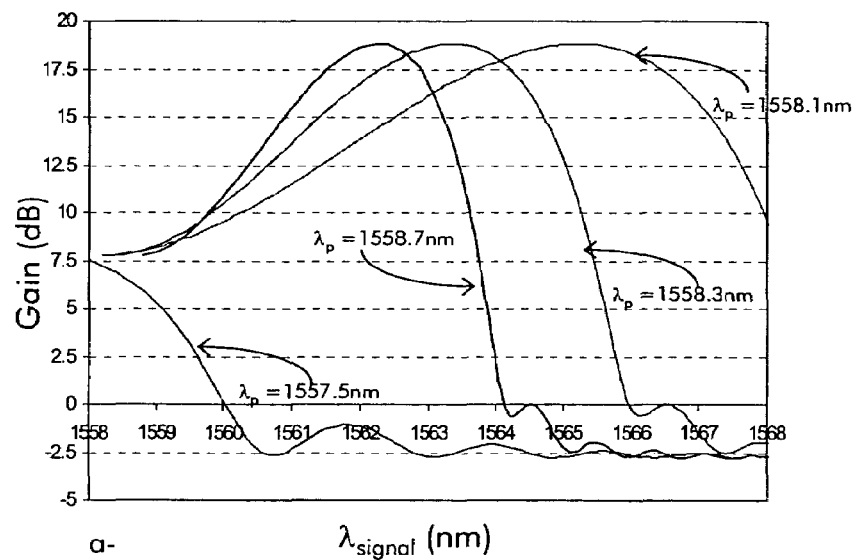
FIG: 3

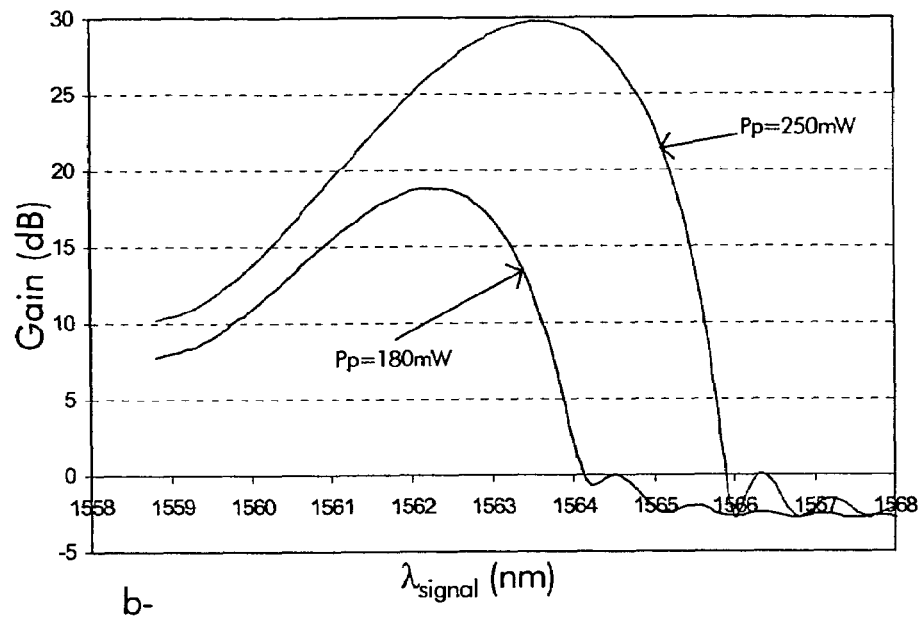
b-
FIG: 4
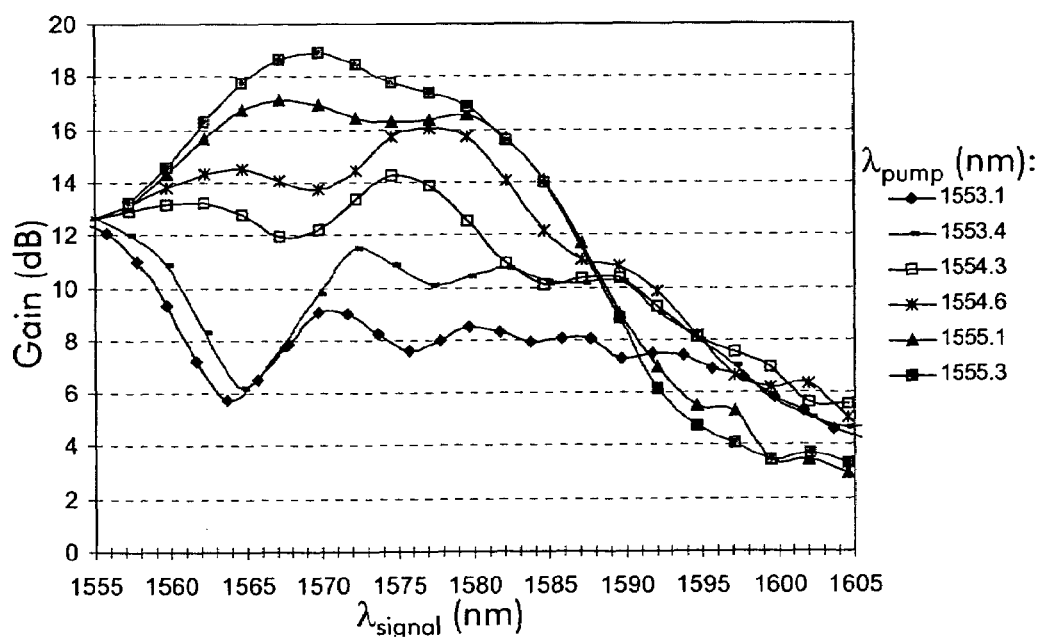
FIG: 5

PARAMETRIC AMPLIFIER WITH ADJUSTABLE PUMP SOURCE

BACKGROUND OF THE INVENTION

The invention is based on a priority application EP 03 291 570.4 which is hereby incorporated by reference.

The invention is related to a parametric amplifier connected to a pump laser with a control device for adapt the pump laser. The invention is also related to a transmission system using this parametric amplifier. In addition the invention comprises a method for controlling the pump laser source in an iterative process.

Optical amplifiers of the type in which the amplitude of electric field of light is directly amplified are applicable to the following uses in the optical fiber transmission system and on the optical amplifiers of this type is being made in various areas:—By increasing the output of a light source of the signal light in an optical transmitter, the transmission distance can be increased. When the optical amplifier is used for the light source of local light in an optical receiver on a coherent optical wave communication system, the reception sensitivity can be improved.

By performing optical amplification in the stage immediately before the photoelectric conversion stage, the reception sensitivity can be improved.

By the direct amplification of light, as compared with the method in a conventional optical repeater in which a light signal is once photo-electrically converted into an electric signal and then the electric signal is amplified, it becomes possible to make the repeater itself smaller in size and also to increase the repeater-to-repeater distance.

Parametric amplifcation is a well known phenomenon in materials providing X(2) nonlinearity. However, parametric amplification can also be obtained in optical fibers exploiting the X(3) nonlinearity. New high power light sources and optical fibers with a nonlinear parameter 5–10 times higher than for conventional fibers as well as the need of amplification outside the conventional Erbium band has increased the interest in such optical parametric amplifiers (OPA). The fiber based OPA is a well-known technique offering discrete or "lumped" gain using only a few hundred meters of fiber. It offers a wide gain bandwidth and may in similarity with the Raman amplifier [be tailored to operate at any wavelength]. An OPA is pumped with one or several intense pump waves providing gain over two wavelength bands surrounding the single pump wave or, in the latter case, the wavelength bands surrounding each of the pumps. As the parametric gain process do not rely on energy transitions between energy states it enable a wideband and at gain profile contrary to the Raman and the Erbium doped fiber amplifier. The underlying process is based on highly efficient four photon mixing (FPM) relying on the relative phase between four interacting photons. An very important application is the possibility of in-line amplification with an ideal noise figure of 0 dB. This should be compared to the quantum limited noise figure of 3 dB for standard phase-insensitive amplifiers. For the phase-insensitive OPA, two photons at one or two pump wavelengths with arbitrary phases will interact with a signal photon. A fourth photon, the idler, will be formed with a phase such that the phase difference between the pump photons and the signal and idler photon satisfies a phase matching condition. For the phase-insensitive OPA the requirements for its implementation are substantially relaxed and it still offers the important properties of high differential gain, optional wavelength conversion and operation at an arbitrary wavelength. As the Kerr effect, similarly to the Raman process, relies on non-linear interactions in the fiber, the intrinsic gain response time for an OPA is in the same order as for the Raman amplifier (a few femtoseconds). This prevents in many, but not all cases, the amplifier from operating in a saturated mode.

The calculation shows that for the perfect phase matching case, the parametric gain is approximately exponentially proportional to the applied pump power. A very simple expression for the OPA peak gain may be obtained as:
$G_{dB}=10 \log_{10}[\frac{1}{4}\exp(2_\gamma P_p L)]=P_p L S_P-6$, where
$S_P=10 \log_{10}[\exp(2)]_\gamma \approx 8.7_\gamma$ is introduced as the parametric gain slope in
[dB/W/km], with
$\gamma=2\pi n_2/\lambda A_{eff}$ as non linear coefficient and
$n_2$ the fiber nonlinear parameter and
$A_{eff}$ the effective modal area of the fiber, with
$P_p$ as pump power and
L as length of the fiber.

The amplifier bandwidth may be defined as the width of each gain lobe surrounding $\lambda_p$. From the equitation it may be observed that the amplifier bandwidth for a fixed $_\gamma P_p L$ will increase with decreasing L as the reduction in $G_s$ with respect to $\lambda$ will be "accelerated" by the longer fiber length. On the other hand, since $\lambda P_p$ increases as L decreases, the peak gain wavelength will be pushed further away from $\lambda_p$.

Another factor to take into account for the OPA gain bandwidth is the fact that $\lambda_0$ the zero-dispersion in a real fiber is slightly distributed along the fiber length. This will flatten the resulting gain bandwidth compared to a fixed $\lambda_0$ wavelength but will decrease the peak gain. By deliberately introducing a $\lambda_0$ variation in the fiber it has been shown that a flat, broadband operation may be achieved.

Summarizing, key parameters such as high pump power, high non linearity coefficient, a short fiber length, a pump wavelength close to the zero-dispersion wavelength, and a low dispersion slope are identified for achieving a high gain and a wide bandwidth in single pumped fiber optical parametric amplifiers.

Normally the pump power is controlled in a parametric amplifier. One example of controlling the pump power and the gain of an optical amplifier is disclosed in U.S. Pat. No. 6,417,965. The optical amplifier control system provides real time control of an optical amplifier in response to an analog signal having a large dynamic range.

In real fiber transmission systems the dispersion varies along the fiber and with any fiber piece. In a result only an average measurement of the zero dispersion is possible. Since the parametric gain depends on every local dispersion the resulting parametric gain is not easily to foreseen. The prior art solution is to try for any fiber piece several pump sources to optimize the gain spectrum the best adapted to the application. With a fixed pump wavelength the parametric gain spectrum is also fixed. Increasing the pump level will than also influence the gain spectrum without further possibilities to adapt.

SUMMARY OF THE INVENTION

The invention solves the problem in a parametric amplifier, which comprises a pump source that can be either tuned in power, and in wavelength.

More especially the invention describes a control loop for a parametric amplifier comprising a pump source that can be adapted in power and gain wavelength dynamically during operation of the amplifier.

Since the parametric gain band depends on the pump power and the pump wavelength, the control of both parameters gives a better control of the amplification band. The choice of the pump wavelength can compensate the modifications of the band induced by variations of pump power.

If the parameters of the amplifying fibre and of the pump are defined for a given parametric amplifier, thanks to this amplifier architecture, the pump wavelength can be adapted to the uncontrolled longitudinal variations of chromatic dispersion.

The amplifier characteristics can be adapted to the system requirements (high gain or wide amplification band) if the pump wavelength can be tuned on a wide band (~5 nm).

BRIEF DESCRIPTION OF THE DRAWINGS

FIG. 2 is a scheme for control of a parametric amplifier

FIG. 3 shows simulated parametric gain for different wavelengths of pump

FIG. 4 shows simulated parametric gain for different power of pump

FIG. 5 shows experimental results o gain spectrum

Figure 1:
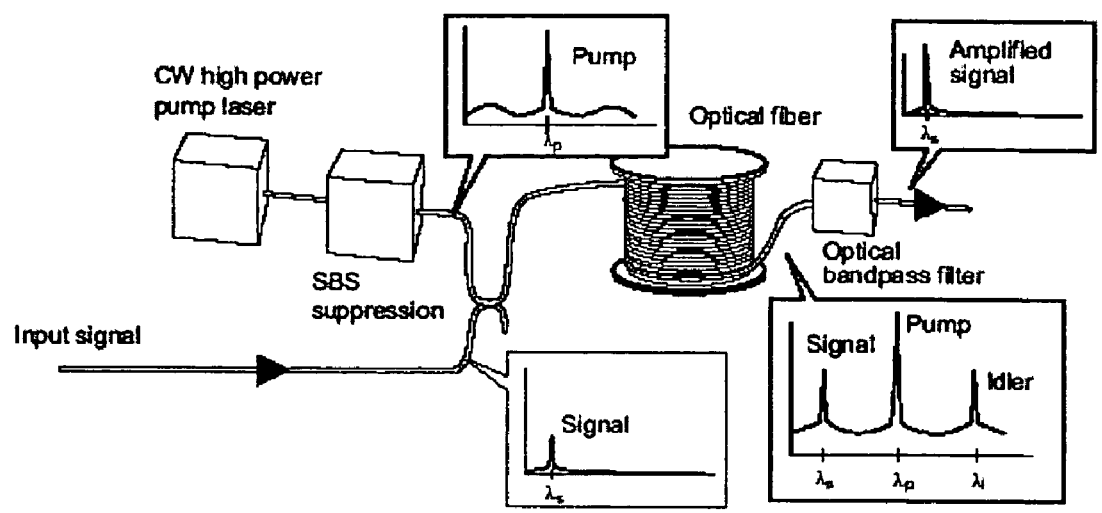
FIG. 1 shows the scheme of an parametric amplifier.

Further details of the invention are described in the following description.

A parametric amplifier 1 is essentially constituted by a fiber pumped by a laser of high power. The pump light is coupled through a common coupler. In the schematic figure the pump power is fed through a stimulated Brillouin scattering suppression tool to avoid high losses—the signal and the pump wavelength travels co propagating through the fiber. At the output of the amplifying fiber a band pass filter allows to select the amplified signal from the line.

In FIG. 2 the parametric gain control is introduced. A signal 1 is fed to the parametric amplifier via a coupler 2. The second input of this coupler is connected to a pump laser source 8, that can be tuned in wavelength and power by an electrical mean 9. The output of the coupler 2 is connected to a piece of fiber 3, which amplifies the signal. At the end of the fiber a tap 4 splits a part of the signal and fed it to a control mean 6 via a detector 5. The signal output 7 is linked t a transmission another amplifier, a receiver etc.

The coupler 2 is preferably a common dichromatic coupler. The pump laser source is a semiconductor laser, preferably a DFB laser (Distributed Feedback laser) or a DBR (Distributed Bragg reflector laser) with a high cw-output. The pump laser source 3 is coupled to electrical means to influence the refraction index of the semiconductor laser to shift the wavelength. A separate of the same electrical mean is connected to the pump laser source to adopt the injection current for power adaptation.

The amplifying fiber is a high non-linear fiber with a small effective area and a particular index profile, which is commercially available. The fiber does not comprise any dopants for amplification. The tap 4 taps either WDM signals or any other kind of optical signals. The detector 5 is a photodiode, which converts the optical power at the input into an electrical current. This current can be afterwards transformed to a digital signal and process by the control device 6. A process for adapting the current of the pump laser source is described in the U.S. Pat. No. 6,417,965, which herby incorporated by reference.

Figure 6:
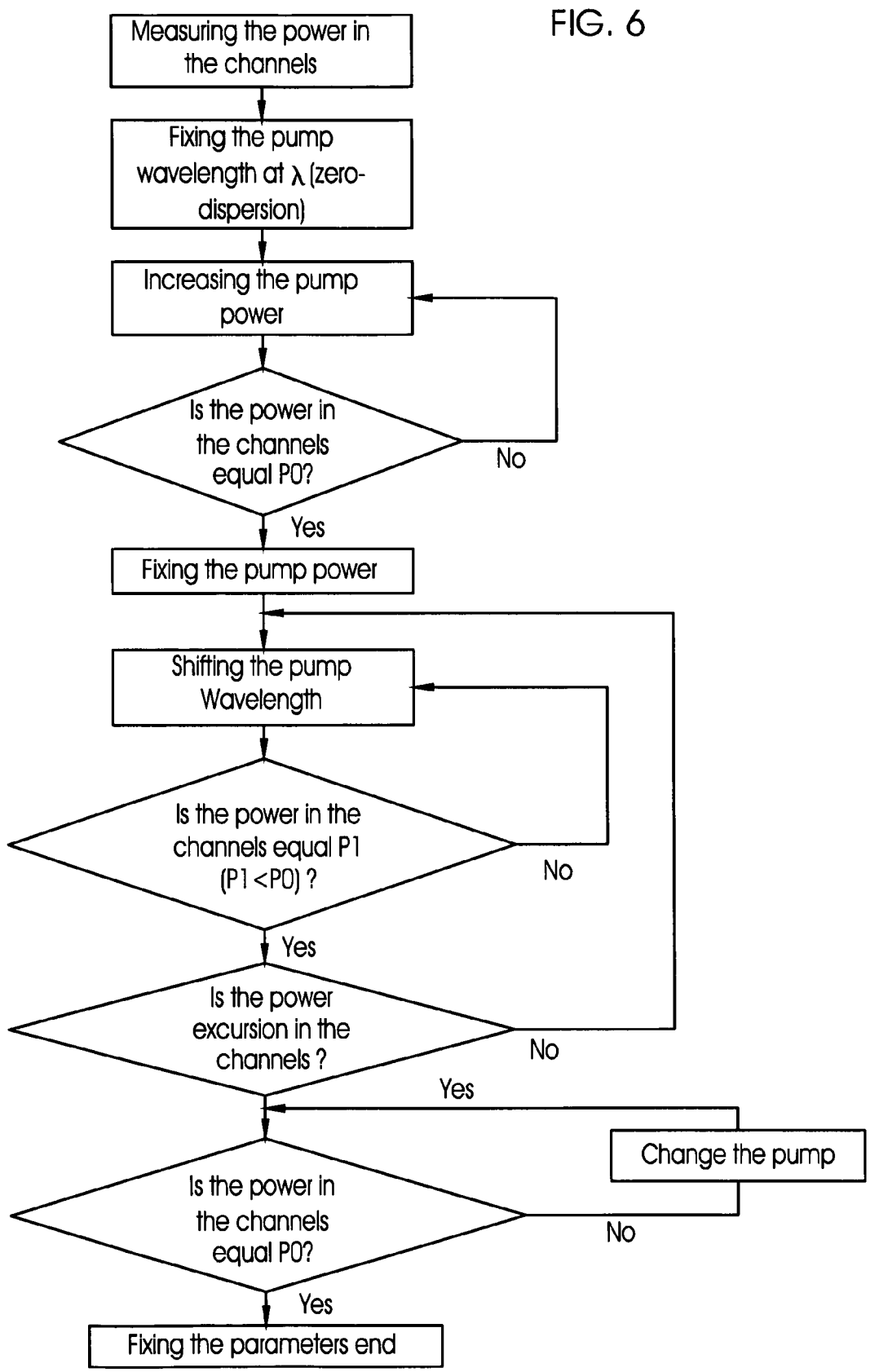
FIG. 6 a flow diagram for the procedure

The detector 5 is an optical power monitor, which measures the power of all the channels of the grid. The power of the single channels are measured after a demultiplexing channel by channel or in a parallel procedure. To make the process more effective a number of pre-selected channels are measured as representatives for the gain profile of the parametric amplifier. For running the process two power thresholds are fixed $P_0 > P_1$. The process is explained in the flow chart of FIG. 6. First the pump wavelength is fixed at the average zero-dispersion wavelength of the nonlinear fiber and the pump power is increased until the minimum power of the wavelength grid is $P_0$. Then the wavelength of the pump is tuned to reduce the gain excursion on the grid while keeping the minimum power of the grid superior to $P_1$ (several pump wavelengths are tested). The role of P1 is to control that there is still amplification. This is important because you can reduce the power excursion too much or in the wrong direction. Finally the pump power is adapted so that the minimum power of the measured channels of the grid is $P_0$. From this stage, the pump wavelength, then the pump power can be successively optimized in an iterative process. At the final step it is also possible to fix the pump wavelength by retuning the pump wavelength at this step and search for the minimum gain excursion. Than finally the pump power is readapted for achieve a minimum power P0. This process is recursively done until both wavelength and power do not change any more.

The first adaptation of the pump wavelength can be a coarse adaptation by testing several pump wavelengths with large spectral shifts (0.5 nm). For the successive optimizations of the pump wavelength and the pump power in the iterative process, the pump wavelength adaptation can be a fine adaptation.

The adaptation must be done only one time unless the pump wavelength changes by aging.

The FIGS. 3 and 4 show simulation for the parametric gain. In a parametric amplifier, the level of gain (at one signal wavelength) and the shape of the gain spectrum depend on the position of the pump wavelength with regard to the zero dispersion wavelength of the amplifying fiber. For example, we simulate parametric gain in a standard Dispersion-Shifted-Fiber (nonlinear coefficient=$2W^{-1}.km^{-1}$, L=12 km) pumped by a power of 180 mW and by different pump wavelengths. The zero dispersion wavelength is 1557.9 nm and the 4 pump wavelengths are 1557.5, 1558.1, 1558.3 and 1558.5 nm (FIG. 1-*a*). We show also, in FIG. 3, the influence of pump power on the spectral amplification band (pump wavelength=1558.7 nm). A reduction of pump power induces a reduction of the amplification band, as shown in FIG. 4, which can be compensated by tuning the pump wavelength to a lower wavelength (1558.3 nm).

Experimentally, we have measured parametric gain spectra for different pump wavelengths with a fixed pump power (FIG. 5). These results show that the parametric gain spectrum can be controlled with a tunable pump wavelength. For instance, at 1575 nm, parametric gain varies from 7.6 to 17.7 dB.

Moreover in real fibers, chromatic dispersion varies along the fiber so that the parametric gain produced by one fiber can not be exactly predicted. Consequently a tunable pump wavelength enables to compensate some of these variations. For example, in the presented experiments, the average zero-dispersion wavelength of the fiber is evaluated to 1554.3 nm, but for a 1554.3 nm pump wavelength, the maximum of gain (14.3 dB) is lower than expected because of dispersion variations. With a pump wavelength slightly different, a higher gain (19 dB) is obtained. Tuning the pump wavelength enables to choose the shape of the gain spectra.

The invention claimed is:

1. A method for optimizing the gain of a parametric amplifier for a WDM signal, the method comprising:
   a) fixing a pump wavelength of said amplifier at a first wavelength according to a zero dispersion of an optical fiber;
   b) increasing a pump power of said amplifier at said first wavelength so that measured channel powers of a wavelength grid reach a first level P0;
   c) tuning a wavelength of a pump source so as to reduce an excursion of the measured channel powers of the wavelength grid and maintain a minimum power of the channels of the grid at P1, where P1<P0;
   d) increasing or decreasing the pump power so that the measured channel powers of the wavelength grid reach the first level P0; and
   e) running the procedure steps c) to d) to obtain the first level P0 in the channels and obtain the minimum excursion in the channels.

2. A method according to claim 1, wherein the wavelength of the pump laser source is tuned in steps.

3. A method according to claim 1, wherein the wavelength of the pump laser source is tuned continuously.

4. A method according to claim 1, wherein all channels of the wavelength grid are measured.

5. A method according to claim 1, wherein a representative set of channels of the wavelength grid are measured.

* * * * *